United States Patent

Asano et al.

[11] Patent Number: 6,075,916
[45] Date of Patent: Jun. 13, 2000

[54] IMAGE RECORDING AND REPRODUCTION APPARATUS AND INTERFACE CIRCUIT FOR USE IN SUCH AN APPARATUS

[75] Inventors: Makoto Asano, Sagamihana; Hidetoshi Takeda, Kadoma, both of Japan

[73] Assignee: U.S. Philips Corporation, New York, N.Y.

[21] Appl. No.: 08/764,832

[22] Filed: Dec. 12, 1996

[30] Foreign Application Priority Data

Dec. 15, 1995 [JP] Japan .................................... 7-347701

[51] Int. Cl.[7] .................................................. H04N 5/76
[52] U.S. Cl. ............................................. 386/46; 386/52
[58] Field of Search .................................. 386/40, 45, 1,
386/33, 46, 111, 112, 52, 125, 126; 348/423, 7; 360/32, 48, 69; 345/326–328, 520, 521; 370/278, 280, 282, 546; H04N 5/76, 5/765, 5/92, 9/79

[56] References Cited

U.S. PATENT DOCUMENTS

| | | | |
|---|---|---|---|
| 4,366,402 | 12/1982 | Marsoner | 361/289 |
| 4,530,048 | 7/1985 | Proper | 364/200 |
| 4,555,729 | 11/1985 | Driessen | 382/43 |
| 4,567,518 | 1/1986 | Driessen | 382/43 |
| 4,632,327 | 12/1986 | Kreeft et al. | 156/502 |
| 4,699,328 | 10/1987 | Kreeft et al. | 156/502 |
| 5,481,543 | 1/1996 | Veltman | 348/423 |
| 5,511,000 | 4/1996 | Kaloi et al. | 364/514 A |
| 5,544,176 | 8/1996 | Fujii et al. | 348/423 |
| 5,568,494 | 10/1996 | Zwaans | 371/40.1 |
| 5,596,564 | 1/1997 | Fukushima et al. | 386/126 |

*Primary Examiner*—Thai Tran
*Attorney, Agent, or Firm*—Steven R. Biren

[57] ABSTRACT

The invention has an object to provide a digital VCR with a packet communication interface to a packet communication bus, which VCR can be used for reproduction, recording and editing in which image signals from two or more reproduction VCRs are mixed. A synchronization buffer is provided in the interface in which a data in accordance with synchronizing data which is contained in a packet 6 is stored. Image signal data received from the bus or to be transmitted to the bus is stored in a separate transmission buffer. The VCR can be switched between different modes in which the direction of synchronization data flow (from the bus or to the bus) and image signal data flow can be selected independently of one another. Data for storing in the synchronization buffer is selected from the packet 6 by controlling of an external synchronization controller. A capacity of the synchronization buffer is smaller than a capacity of the transmission buffer, because of that a selected data from the packet 6 is stored in this buffer only.

18 Claims, 2 Drawing Sheets

IMAGE RECORDING AND REPRODUCTION APPARATUS AND INTERFACE CIRCUIT FOR USE IN SUCH AN APPARATUS

BACKGROUND OF THE INVENTION

The invention relates to a digital image signal recording and reproduction apparatus and a packet communication interface circuit for use in such an apparatus.

When video cassette recorders (VCR) for recording and reproducing an analog image signal are used for duplication, a recording VCR records an image signal by synchronizing to the reproduction timing of a reproducing VCR i.e. to frame timing. The reproduction VCR outputs a synchronizing signal which represents a frame timing of the reproduction VCR to the recording VCR for realizing the synchronization. The recording VCR recognizes a transmission timing of a frame based on the synchronization signal and records the image signal for every one frame unit.

When an analog image signal is used, transmission can cause degradation of the image. Degradation may be avoided by transmitting a digital image signal. A digital image signal is transmitted (a Digital VCR is used) via a digital interface, for example, a bus which corresponds to IEEE1394 standard. On this standard, several apparatuses, e.g. VCRs are connected each other by the bus (shared bus).

For duplication, the reproducing VCR transmits packets containing image signal data. At least some of the packets contain synchronization information, for example in the form of a clock counter value of the bus clock counter of a IEEE1394 standard bus, the clock counter value being sampled from the bus clock counter at an instant in time which is in a fixed relation to instant the beginning of the frame is read from the reproducing VCR.

The recording VCR receives the packets from the reproducing VCR and records the image signal data from the packets. In addition the recording VCR retrieves the synchronization information from the packets and synchronizes the recording mechanism, such as the scanning head, to this synchronization information.

SUMMARY OF THE INVENTION

Amongst others it is an object of the invention to provide for a digital image signal recording and reproducing apparatus which can also be used for mixing the contents of two video cassettes (VC) are onto one video cassette.

It is a further object of the invention to reduce the capacity of buffer memory needed in such a digital image signal recording and reproducing apparatus.

It is another object of the invention to provide for an interface circuit which makes it possible to provide such a digital image signal recording and reproducing apparatus.

The invention provides a digital image signal recording and reproduction apparatus comprising
- a connection for a digital packet communication bus;
- a receiving circuit for receiving a packet from the communication bus;
- a synchronizing buffer for storing synchronization information selected from the packet;
- a transmission buffer for storing signal data;
- an internal circuit for switching the recording and reproduction apparatus at least between a first mode and a second mode, the image recording and reproduction apparatus storing received signal data from the packet in the transmission buffer for recording in the first mode, the image recording and reproduction apparatus storing reproduced signal data in the transmission buffer for transmission via the communication bus in the second mode, the image recording and reproduction apparatus synchronizing recording and reproduction timing, in the first and second mode respectively, both according to the synchronization information received from the packet and stored in the synchronization buffer.

Because of this, the digital image signal recording and reproduction apparatus can be used both as a recording VCR and as a reproduction VCR synchronized to another VCR for mixing the contents of two video cassettes.

When the contents of two video cassettes (VC) are mixed onto one video cassette, two reproduction VCRs and one recording VCR are used. Synchronization must be provided between all of the reproducing VCRs mutually and the recording VCR. For example transmission of a synchronization signal from a first reproduction VCR to a second reproduction VCR is provided. Thus, the second reproduction VCR performs reproduction by synchronizing with the first reproduction VCR. In this case, the second reproduction VCR does not perform reproduction under control of its own timing but performs reproduction in an external synchronism reproduction mode in which the second reproducing VCR performs reproduction in synchronism with the first reproduction VCR.

In the first mode the digital image signal recording and reproduction apparatus is able to function as a recording VCR, synchronizing to a reproduction VCR, and recording digital image signal data received from the reproduction VCR. In the second mode, the digital image signal recording and reproduction apparatus is able to function as a second reproduction VCR, synchronizing to a first reproduction VCR and reproducing image signal data from an inserted video cassette. In both modes the same transmission buffer is used for signal data. Alternatively, both the first reproducing VCR and the second reproducing VCR can synchronize to the recording VCR, when the recording VCR transmits packets providing synchronization information about its recording mechanism, and receives packets with image signal data from the first and second reproducing VCR.

The digital image signal recording and reproduction apparatus according to the invention has an embodiment in which the internal circuit is arranged for switching the image signal recording and reproduction apparatus at least between the first mode, the second mode and a third mode, the image signal recording and reproduction apparatus generating reproduction timing autonomously in the third mode, storing reproduced signal data in the transmission buffer in the third mode and transmitting a further packet via the bus comprising the reproduced signal data and synchronization information representing the autonomously generated timing in the third mode. In the third mode, the digital image signal recording and reproduction apparatus operates as a reproducing VCR which issues both image signal data and synchronization information. Thus this reproducing VCR can be used in combination with a further reproducing VCR.

The digital image signal recording and reproduction apparatus according to the invention has an embodiment in which the internal circuit is arranged for switching the image signal recording and reproduction apparatus at least between the first mode, the second mode and a fourth mode, the image signal recording and reproduction apparatus generating recording timing autonomously in the fourth mode, storing received signal data from the packet in the transmission buffer for recording in the fourth mode, and transmitting a further packet via the bus comprising synchronization information which is stored in the transmission buffer and represents the autonomously generated recording timing in the fourth mode. In the fourth mode, the digital image signal recording and reproduction apparatus operates as a recording VCR which issues synchronization information. Thus this recording VCR can be used in combination with any number of reproducing VCRs, which can synchronize their reproduction timing to one recording VCR.

As the synchronization buffer needs to store only synchronization information such as a clock counter value selected from a packet, the synchronization buffer may be substantially smaller than the transmission buffer, thus saving memory capacity. Only one transmission buffer needs to be provided used either for reproduction or for recording, independently of whether the apparatus transmits or receives packets containing synchronization information.

The required interface circuitry can be incorporated in a single integrated circuit.

BRIEF DESCRIPTION OF THE DRAWINGS

The above and further aspects of the invention will be explained in more tail with reference to a drawing of an embodiment, in with FIG. 1 is an arrangement drawing of apparatuses using a shared bus.

DESCRIPTION OF THE EMBODIMENTS

Figure 1:
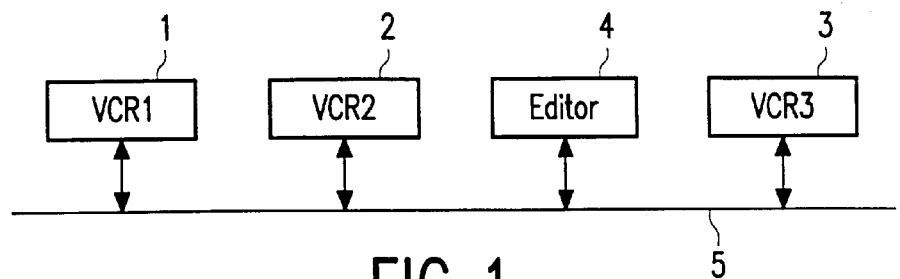

FIG. 1 shows an apparatus arrangement containing a first reproduction VCR 1, a second reproduction VCR 2, a recording VCR 3 and an editor 4 mutually connected via a bus 5.

In operation the contents of two video cassettes (VC) are mixed onto one video cassette, using two reproduction VCRs 1, 2 and one recording VCR 3. The VCRs 1, 2, 3 are logically connected to each other by the editor 4. The editor 4 is an apparatus for mixing the image signals which are outputted by the reproduction VCRs 1, 2. Editing choice from the image signal of different VCRs 1, 2 changes in frame units, therefore frames from different reproduction VCRs 1, 2 and the recording VCR should start at substantially the same instant in time.

The second reproduction VCR 2 performs reproduction by synchronizing with the first reproduction VCR 1. In this case, the second reproduction VCR 2 does not perform reproduction under control of its own timing but performs reproduction in an external synchronism reproduction mode in which the second reproducing VCR 2 performs reproduction in synchronism with the first reproduction VCR 1. Furthermore, the recording VCR 3 performs recording in synchronism with the first reproduction VCR 1.

When the first and second reproduction VCRs 1, 2 operate in synchronism with the recording VCR 3, mixing and switching can be realized in the editor 4 and the image signal which is outputted by the editor 4 can be recorded.

The bus 5 corresponds for example to the IEEE1394 standard and connects all of the apparatuses, i.e. VCRs 1, 2, 3 and the editor 4 to each other by the bus (shared bus).

Figure 2:
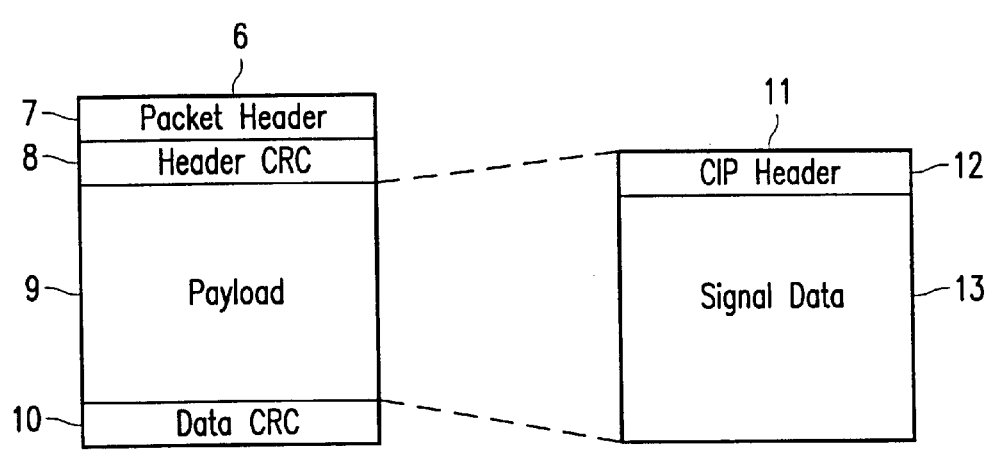
FIG. 2 shows the arrangement of a packet

A packet which is used on the packet communication bus 5 is the same as, for example a packet 6 in FIG. 2. This packet 6 contains sequentially a packet header 7, a header CRC (Cyclic Redundancy Code) 8, a payload 9 and a data CRC 10. The payload 9, 11 comprises a CIP header 12 and signal data 13. The CIP header 12 may contain synchronization information.

Figure 3:
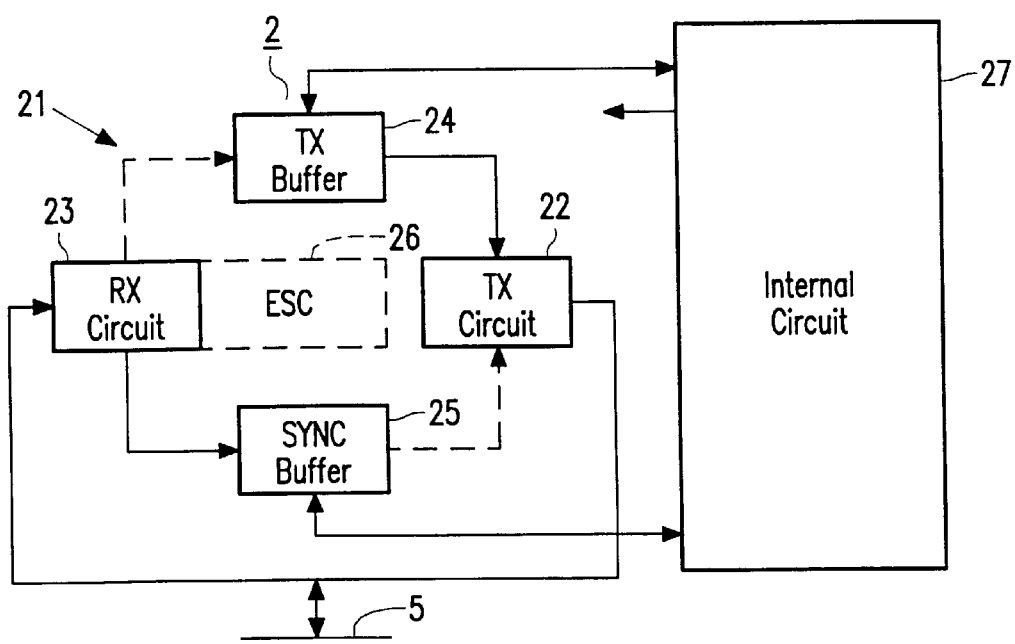
FIG. 3 is a conceptual drawing of a packet communication apparatus according to the invention.

FIG. 3 shows a conceptual view of the bus interface circuit 21 of the VCR according to the invention. The VCR is a digital VCR (DVC), for example an apparatus which is used in the reproduction VCR 2 which is shown in FIG. 1. The bus interface circuit 21 comprises a transmission circuit 22, a receiving circuit 23, a transmission buffer 24, a synchronizing buffer 25 and an external synchronizing controller (ESC) 26. The transmission circuit 22 is a general communication interface for realizing an electrical interface between the transmission buffer 24 or the synchronization buffer 25 and the shared bus 5 and for transmitting a packet which is stored in the transmission buffer 24 or the synchronization buffer 25 to the shared bus 5. The receiving circuit 23 is a communication interface for electrically interfacing between the transmission buffer 24, and the synchronizing buffer 25 and the shared bus 5 and for storing the CIP header 12 which is included in the packet 6. The transmission buffer 24 is a memory (random access memory) which stores the packet 6 from the receiving circuit 23 or from the internal circuit 27. The synchronizing buffer 25 is a memory (random access memory) which stores the CIP header 12 included in the packet which is received by the receiving circuit 23 or from the internal circuit 27. A data volume of the packet 6 is, for example 492 bytes. Thus, a memory which has a storing capacity of at least 492 bytes is used. As the synchronizing controller 26 is, for example a circuit which is activated when an internal circuit receives from the reproduction VCR 1 an instruction starting the external synchronizing operation mode. The controller 26 is realized by, for example microprocessor which performs an operation selecting the CIP header 12 from the packet 6. When a packet header 7 and the CIP header 12 have a specific mark, the operation selecting the CIP header 12 only from the packet 6 is, for example, realized by selecting the mark and thus the header by arranging a compactor for searching the mark. Furthermore, by counting the number of bits from a head of the packet 6 up until the bits making up the CIP header, which contains for example eight bits, the selection of the CIP header 12 can be realized. When the reproducing VCR 2 operates in the external synchronizing mode, the internal circuit 27 activates the external synchronizing controller 26. After the activation, under control of the external synchronizing controller 26, the CIP header 12 is selected from the packet 6 of the reproducing VCR 1 which is received via the shared bus 5. The selected CIP header 12 is stored in the synchronizing buffer 25.

After the storing, the internal circuit 27 recognizes the synchronizing information from the CIP header 12 in the synchronizing buffer 25, and realizes the reproduction for the packet 6 which is stored in the transmission buffer 24. The stored packet 6 will be transmitted to the recording VCR 3 via the shared bus 5.

In case the recording VCR 3 operates in the external synchronizing control mode, in the same way as the reproducing VCR 2, a construction as shown in FIG. 3 is arranged on the recording VCR 3. Thus, in the recording VCR 3, the external synchronizing controller 26 stores the CIP header 12 in the synchronizing buffer 25, at the same time, the internal circuit 27 recognizes the synchronizing information from the CIP header 12 which is stored in the synchronizing buffer 25, and records the packet 6 which is stored in the transmission buffer 24 in synchronisin with the reproduction VCRs 1, 2. In the reproduction VCR 2, the transmission buffer 24 is used for storing the packet 6 to be transmitted, but in the recording VCR 3, the transmission buffer 24 is used for storing the packet 6 to be recorded.

When the reproducing VCRs 1, 2 are operated in synchronism with the recording VCR 3, said recording VCR 3 transmits the packet 6 which is provided in the CIP header 12 only to said reproducing VCRs 1,2. Thus the packet 6 which is not provided with the signal data but with the CIP header 12 is transmitted from the recording VCR 3 to the reproducing VCRs 1,2.

As described above, by the operation of the external synchronizing controller 26, the CIP header 12 is selected from the packet 6 and said packet is stored in the synchronizing buffer 25. Furthermore, by said operation, an operation in the external synchronizing operation mode is performed on the basis of synchronizing information which is included in the CIP header 12.

Figure 4:
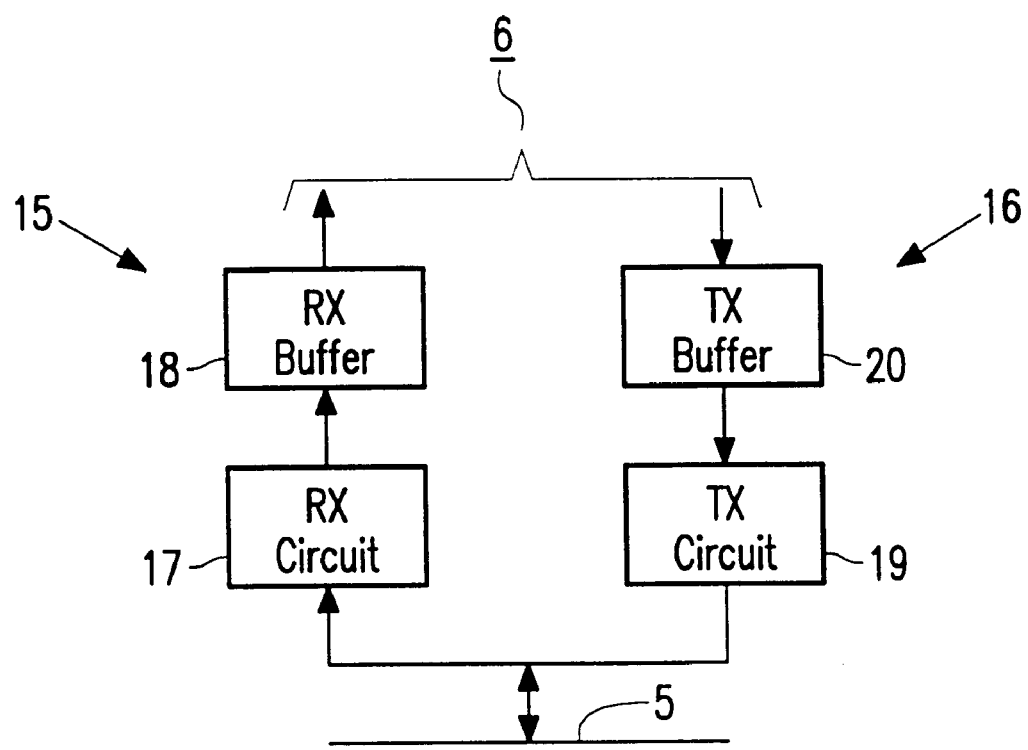
FIG. 4 is a block diagram of a conventional full duplex interface circuit

FIG. 4 shows a construction of a full duplex circuit. As shown in this figure, the receiving full duplex circuit comprises a receiving part 15 which receives the packet 6 which is outputted for example by the reproduction VCR 1 via the shared bus 5 and a transmitting part 16 which transmits the packet 6 to the shared bus 5. The receiving part 15 is provided with a receiving circuit 17 which realizes an electrical interface to the shared bus and a receiving buffer 18 which comprises a memory circuit for memorizing a packet 6 which is received by the receiving circuit 17. In the same way, the transmission part 16 is provided with a transmission circuit 19 for realizing the electrical interface to the shared bus 5 and a transmission buffer 20 which comprises a memory circuit for memorizing temporarily the packet to be transmitted. The receiving buffer 18 and the transmission buffer 20 are connected to a microprocessor for computing and generating a packet, or to a circuit and a construction for driving the video cassette (not shown).

In the reproduction VCR 2, a reproducing operation which is synchronized with the reproduction VCR 1 is performed by recognizing the synchronizing signal from the packet 6 of the reproduction VCR 1 which is stored in the receiving buffer 18. Thus operation in an external synchronizing reproduction mode is realized. On the reproduction VCR 2, in a timing which corresponds to a frame timing of the reproduction VCR 1, reproduction is performed and the packet 6 which contains a reproduced image information is stored in a transmission buffer. The packet 6 which is stored in the transmission buffer 20 is transmitted via the shared bus 5 to the editor 4 via the transmission circuit 19.

As shown in FIG. 4, in full-duplex technology capable of receiving and transmitting packets at substantially the same time buffers (memories) which have the same capacity must be arranged on a transmission part and a receiving part of the reproduction VCR 2 which operates in the external synchronizing reproduction mode. For operation of the reproduction VCR 2 in the external synchronizing reproduction mode only synchronizing information is needed which is included in a CIP header 12 in the packet 6 which is stored in the receiving buffer 18. Thus, other information of the packet 6 is not needed in this mode. The area which is not used for storing the CIP header 12 but used for storing the other information is an unused storing area. Therefore, this storage area is not needed in a packet communication interface which is intended for use in a VCR that can operate as a reproduction VCR synchronized to another VCR.

The packet communication apparatus according to the invention comprises a receiving circuit for receiving a packet which has a data and an identification data for using synchronization of a packet transmission, a transmission buffer for storing the packet which is received by the receiving circuit, a synchronization buffer for storing the identification data which is contained in the packet and a synchronizing data selection means for realizing, by selecting the identification data from the packet, a step for storing the selected identification data to the synchronization buffer.

In the packet communication apparatus according to the invention, data in accordance with synchronizing information which is selected from the received packet is stored in a synchronization buffer. A capacity of the synchronizing buffer is smaller than a capacity for storing the packet because the buffer needs to store only data according to the synchronizing information. Thus, two buffers which have a capacity for storing a packet, respectively are not needed.

What is claimed is:

1. A digital image signal recording and reproduction apparatus comprising:

a connection for a digital packet communication bus;

a receiving circuit for receiving a packet from the communication bus;

a synchronizing buffer for storing synchronization information selected from the packet;

a transmission buffer for storing signal data;

an internal circuit for switching the recording and reproduction apparatus at least between a first mode and a second mode, the image recording and reproduction apparatus storing received signal data from the packet in the transmission buffer for recording in the first mode, the image recording and reproduction apparatus storing reproduced signal data in the transmission buffer for transmission via the communication bus in the second mode, the image recording and reproduction apparatus synchronizing recording and reproduction timing, in the first and second mode respectively, both according to the synchronization information received from the packet and stored in the synchronization buffer; and a transmission circuit for receiving signals from said transmission buffer and said synchronizing buffer and for providing a signal to said communication bus.

2. A digital image signal recording and reproduction apparatus according to claim 1, the internal circuit being arranged for switching the image signal recording and reproduction apparatus at least between the first mode, the second mode and a third mode, the image signal recording and reproduction apparatus generating reproduction timing autonomously in the third mode, storing reproduced signal data in the transmission buffer in the third mode and transmitting a further packet via the bus comprising the reproduced signal data and synchronization information representing the autonomously generated timing in the third mode.

3. A digital image signal recording and reproduction apparatus according to claim 1, the internal circuit being arranged for switching the image signal recording and reproduction apparatus at least between the first mode, the second mode and a fourth mode, the image signal recording and reproduction apparatus generating recording timing autonomously in the fourth mode, storing received signal data from the packet in the transmission buffer for recording in the fourth mode, and transmitting a further packet via the bus comprising synchronization information which is stored in the transmission buffer and represents the autonomously generated recording timing in the fourth mode.

4. A digital image signal recording and reproduction apparatus according to claim 3, wherein the synchronization buffer has a substantially smaller storage capacity than the transmission buffer.

5. A packet communication interface circuit for use in a digital image signal recording and reproduction apparatus according to claim 4, the interface circuit comprising a connection for a digital packet communication bus;

a receiving circuit for receiving a packet from the communication bus;

a synchronizing buffer for storing synchronization information selected from the packet;

a transmission buffer for storing signal data;

the interface circuit being switchable between a first mode and a second mode, the interface circuit storing received signal data from the packet in the transmission buffer for access by the digital image signal recording and reproduction apparatus in the first mode, the interface circuit transmitting signal data from the transmission buffer via the communication bus in the second mode, the interface circuit storing the synchronizing information received from the packet in both the first and second mode.

6. A packet communication interface circuit according to claim 5, switchable between the first mode, the second mode and a third mode, the interface circuit transmitting signal data from the transmission buffer and synchronization data from the synchronization buffer combined in a packet via the bus in the third mode.

7. A packet communication interface circuit according to claim 6, switchable between at least the first mode, the second mode and a fourth mode, the interface circuit storing received signal data from the packet in the transmission buffer for access by the digital image signal recording and reproduction apparatus in the fourth mode, the interface circuit storing synchronization data received from the digital image signal recording and reproduction apparatus in the synchronization buffer in the fourth mode and transmitting a further packet via the bus comprising the synchronization information from the synchronization buffer in the fourth mode.

8. A packet communication interface circuit according to claim 7, wherein the synchronization buffer has a substantially smaller storage capacity than the transmission buffer.

9. A digital image signal recording and reproduction apparatus according to claim 1, wherein the synchronization buffer has a substantially smaller storage capacity than the transmission buffer.

10. A digital image signal recording and reproduction apparatus according to claim 2, wherein the synchronization buffer has a substantially smaller storage capacity than the transmission buffer.

11. A packet communication interface circuit for use in a digital image signal recording and reproduction apparatus according to claim 1, the interface circuit comprising a connection for a digital packet communication bus;

a receiving circuit for receiving a packet from the communication bus;

a synchronizing buffer for storing synchronization information selected from the packet;

a transmission buffer for storing signal data;

the interface circuit being switchable between a first mode and a second mode, the interface circuit storing received signal data from the packet in the transmission buffer for access by the digital image signal recording and reproduction apparatus in the first mode, the interface circuit transmitting signal data from the transmission buffer via the communication bus in the second mode, the interface circuit storing the synchronizing information received from the packet in both the first and second mode.

12. A packet communication interface circuit for use in a digital image signal recording and reproduction apparatus according to claim 2, the interface circuit comprising a connection for a digital packet communication bus;

a receiving circuit for receiving a packet from the communication bus;

a synchronizing buffer for storing synchronization information selected from the packet;

a transmission buffer for storing signal data;

the interface circuit being switchable between a first mode and a second mode, the interface circuit storing received signal data from the packet in the transmission buffer for access by the digital image signal recording and reproduction apparatus in the first mode, the interface circuit transmitting signal data from the transmission buffer via the communication bus in the second mode, the interface circuit storing the synchronizing information received from the packet in both the first and second mode.

13. A packet communication interface circuit for use in a digital image signal recording and reproduction apparatus according to claim 3, the interface circuit comprising a connection for a digital packet communication bus;

a receiving circuit for receiving a packet from the communication bus;

a synchronizing buffer for storing synchronization information selected from the packet;

a transmission buffer for storing signal data;

the interface circuit being switchable between a first mode and a second mode, the interface circuit storing received signal data from the packet in the transmission buffer for access by the digital image signal recording and reproduction apparatus in the first mode, the interface circuit transmitting signal data from the transmission buffer via the communication bus in the second mode, the interface circuit storing the synchronizing information received from the packet in both the first and second mode.

14. A packet communication interface circuit according to claim 5, switchable between at least the first mode, the second mode and a fourth mode, the interface circuit storing received signal data from the packet in the transmission buffer for access by the digital image signal recording and reproduction apparatus in the fourth mode, the interface circuit storing synchronization data received from the digital image signal recording and reproduction apparatus in the synchronization buffer in the fourth mode and transmitting a further packet via the bus comprising the synchronization information from the synchronization buffer in the fourth mode.

15. A packet communication interface circuit according to claim 5, wherein the synchronization buffer has a substantially smaller storage capacity than the transmission buffer.

16. A packet communication interface circuit according to claim 6, wherein the synchronization buffer has a substantially smaller storage capacity than the transmission buffer.

17. A packet communication interface circuit according to claim 14, wherein the synchronization buffer has a substantially smaller storage capacity than the transmission buffer.

18. A packet communication apparatus comprising a receiving circuit for receiving a reception packet which contains data and identification information for use in synchronization;

a transmission circuit for transmitting a transmission packet which contains data and identification information for use in synchronization;

a transmission buffer for storing the reception packet and the transmission packet;

a synchronization buffer for storing the identification data which is contained in the transmission packet and the reception packet;

a synchronizing data selection means for realizing a step for storing the selected identification data to the synchronizing buffer, by selecting the identification data from the reception packet which is outputted from the receiving circuit.

* * * * *